Nov. 3, 1964   W. A. WILLIAMSON   3,155,251
LIFT TRUCK
Filed April 2, 1962   3 Sheets-Sheet 1
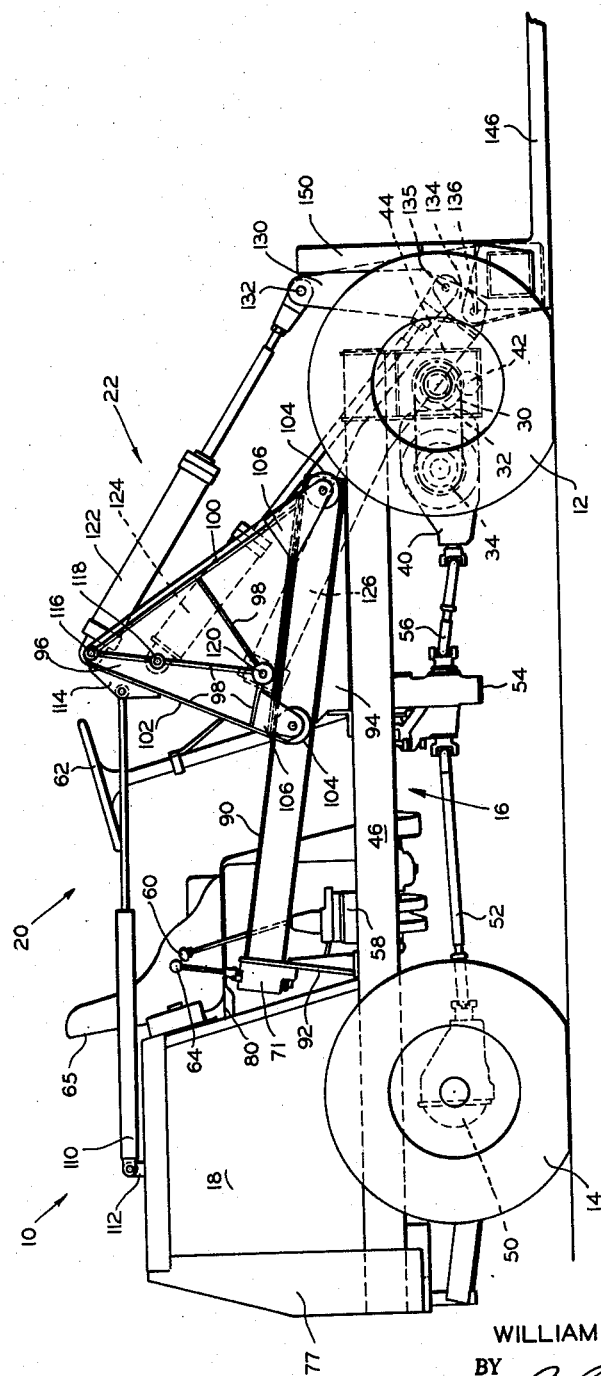
FIG. I
INVENTOR
WILLIAM A. WILLIAMSON
BY
ATTORNEY

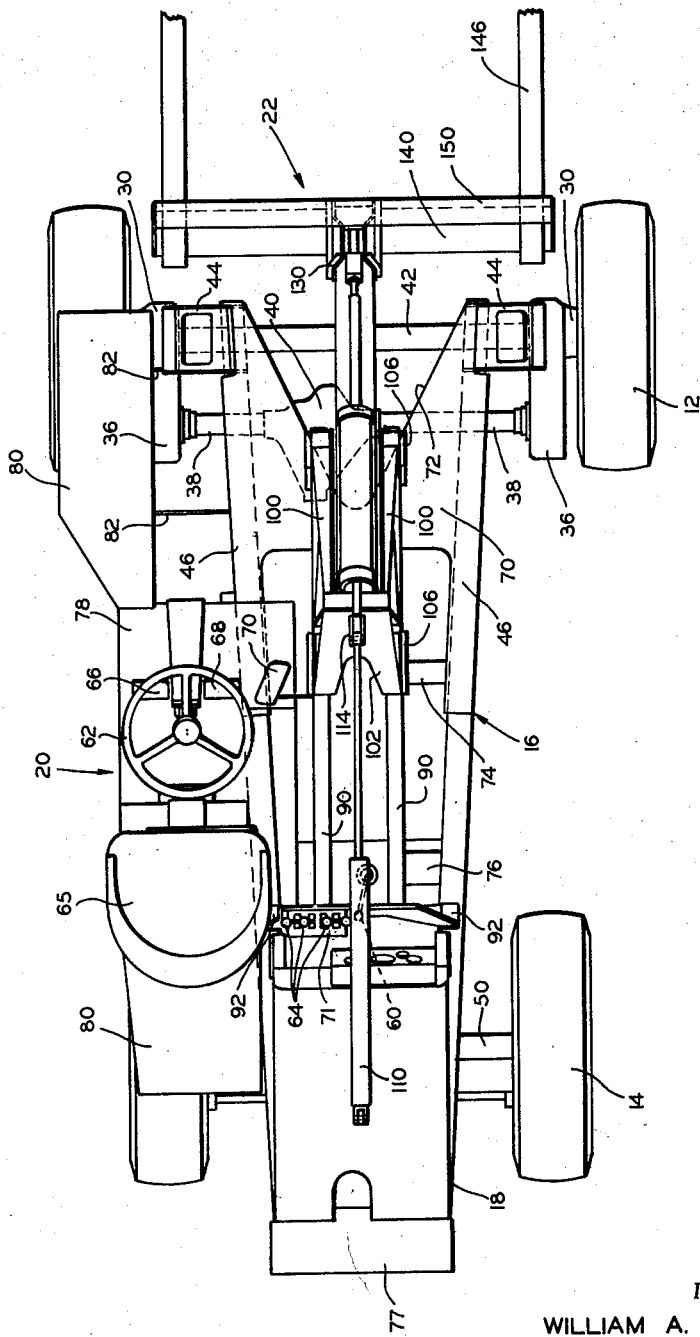

Nov. 3, 1964 W. A. WILLIAMSON 3,155,251
LIFT TRUCK
Filed April 2, 1962 3 Sheets-Sheet 3
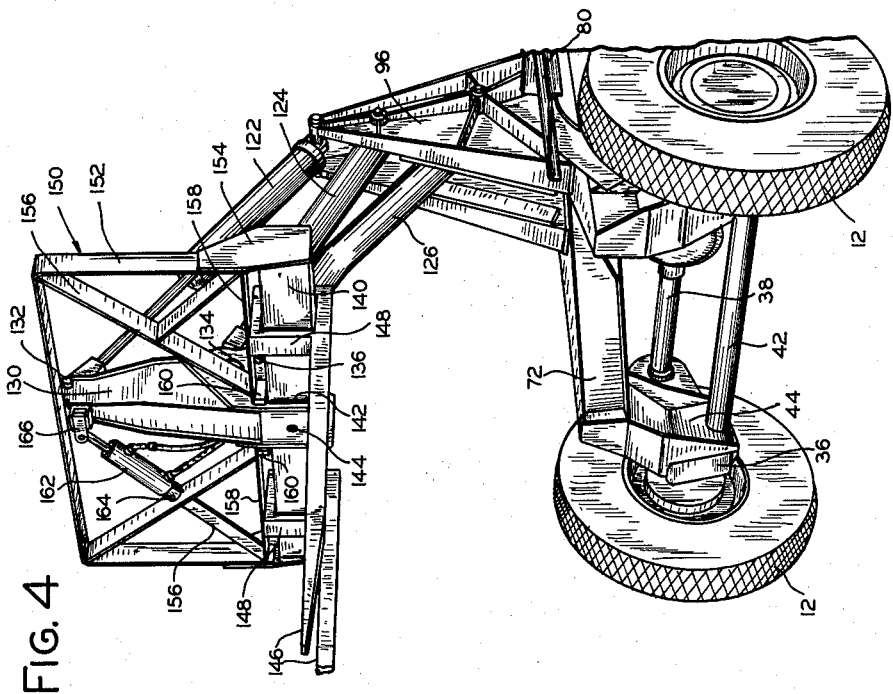
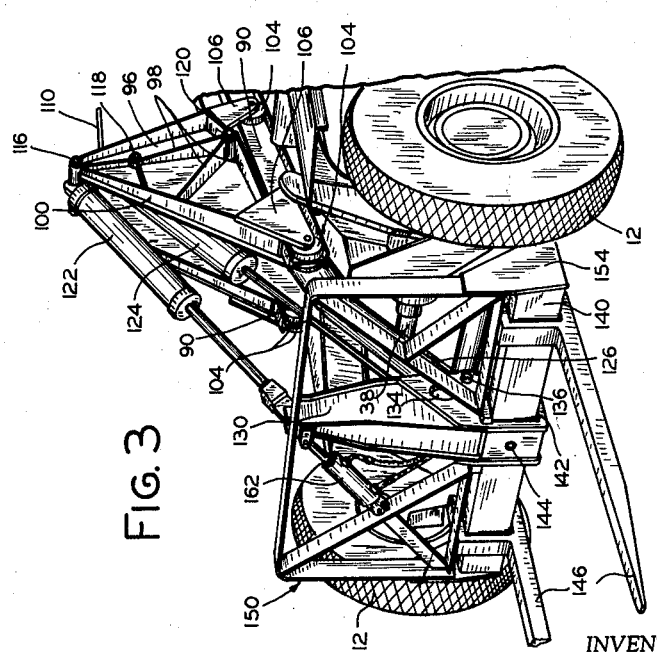
INVENTOR
WILLIAM A. WILLIAMSON
BY J. C. Wiesler
ATTORNEY United States Patent Office 3,155,251
Patented Nov. 3, 1964

3,155,251
LIFT TRUCK
William A. Williamson, Battle Creek, Mich., assignor to Clark Equipment Company, a corporation of Michigan
Filed Apr. 2, 1962, Ser. No. 184,364
15 Claims. (Cl. 214—140)

This invention relates to lift trucks, and more particularly to the construction of load handling mechanism which is mounted on such trucks.

It is an object of the present invention to provide an improved construction of loader mechanism for certain types of lift trucks.

Another object is to provide a relatively lightweight rough terrain lift truck of relative simplicity and low-cost construction.

A further object is to provide a lift truck wherein the load engaging mechanism and the forward portion of the truck chassis are related structurally to permit the load engaging mechanism to be located closely adjacent the axis of the front wheels.

A further object is to provide an improved combined construction of truck chassis, load engaging mechanism and extension and retraction mechanism for the load engaging mechanism.

It is another object of the present invention to provide load engaging means for vehicles of the type contemplated which is oscillatable about longitudinal pivot means.

In carrying out my invention in one embodiment thereof I have provided a front wheel drive lift truck having a rearwardly offset drive axle and an open front frame portion, plus longitudinally extensible and transversely oscillatable load engaging mechanism supported from the chassis by adjustable parallelogram linkage means.

Other objects of the invention will become apparent to persons skilled in the art from the following detailed description taken in conjunction with the drawing wherein:

FIGURE 1 is a side elevational view of a lift truck upon which the loader mechanism of my invention is mounted;

FIGURE 2 is a plan view of the truck shown in FIG. 1;

FIGURE 3 is a front-quarter perspective view of the lift truck shown in FIGS. 1 and 2; and FIGURE 4 is a front-quarter perspective view of a modification of the truck and showing the loader mechanism in an elevated position.

Referring now in detail to FIGS. 1 through 3 of the drawing, a relatively lightweight, four-wheel drive outdoor lift truck adapted for usage on relatively rough terrain is illustrated generally at numeral 10. It comprises generally a pair of front drive wheels 12 and a pair of rear steering-driving wheels 14 supporting a truck frame construction 16 having a rearwardly located engine compartment 18 mounted thereon, an operator's compartment 20, and a loader mechanism 22.

The relatively widely spaced pair of front drive wheels 12 are mounted for rotation with a pair of short stub drive axles 30 having a pair of endless chain drive connections 32 extending rearwardly for connection with a sprocket 34, all in a casing 36. Sprockets 34 on opposite sides of the truck are connected to main drive axle ends 38 which are driven by a conventional differential mechanism 40. A rigid transverse bar member 42 is located forwardly of the drive axle 38, 40 and below stub axles 30, said bar member functioning as a main structural member which is welded to a pair of downwardly depending frame members 44 welded at opposite sides of the truck to elevated and forwardly diverging longitudinal frame members 46, said downwardly depending frame members 44 being in turn suitably secured, as by bolting, to each casing 36, thereby supporting the front drive wheels and axle from the truck frame.

The rear driving-steering wheels 14 are connected to a differential drive axle 50 which is supported suitably from the rear frame portion of the truck and which is drivingly connected by shaft 52 to a centrally located gear drop case 54 which is also connected to the drive axle 38, 40 by a shaft 56 and to a main power transmission 58 by shaft means, not shown. Engine driven transmission 58 is mounted adjacent operator's station 20 and is controlled by a hand actuated gear lever 60. A gasoline engine and accessory devices, not shown, are housed within engine compartment 18.

The operator's station 20 is cantilevered at one side of the vehicle from one of frame members 46, as shown, and comprises a steering wheel 62 adapted to be connected through steering gear and linkage mechanism, not shown, to rear drive wheels 14 for imparting dirigible movement to said wheels, an operator's seat 65, and a plurality of foot pedal controls comprisng clutch, brake and accelerator pedals 66, 68 and 70, respectively. A plurality of valve control levers 64 are mounted adjacent operator's seat 65 for actuating hydraulic control valves housed within box 71 which controls the operation of loader mechanism 22 as described hereinbelow.

The framework of the truck, as mentioned previously, includes a pair of transversely spaced longitudinal beam members 46 which converge towards the rear of the truck, thereby spacing the rear drive-steer wheels more closely than the forward drive wheels and providing at the forward end sufficient lateral spacing for operation of loader mechanism 22 between the wheels 12. A cover plate 70 is connected between the forward ends of frame members 46 and has a V-shaped cut-out section 72 opening forwardly thereof, said frame members 46 being also connected by longitudinally spaced transverse structural members 74 and 76 as well as upright plate means 77 at the rear of members 46. Truck body members, in addition to engine compartment 18, include an operator's floorboard 78, and front and rear fender sections 80 located on the operator's side only above the adjacent wheels and supported from the one frame member 46 by suitably outwardly extending ribs such as shown at numeral 82.

Loader mechanism 22 is mounted upon the frame of the truck by means of a pair of laterally spaced, longitudinally extending and downwardly sloping I-beams 90 supported at a relatively elevated position at the rear ends thereof by a pair of upwardly extending brackets 92 and at the forward ends thereof at a lower level by a pair of generally triangular, transversely spaced brackets 94. A generally triangular pylon construction 96 having a plurality of supporting ribs 98 and comprising a pair of laterally spaced triangular sections 100 connected at the rear ends thereof by a plate 102, is mounted for movement along the track formed by I-beams 90 by means of transversely spaced pairs of rollers 104 which are mounted for rotation on pins adjacent the lower vertices of pylon sections 100, said rollers being connected to downwardly and outwardly extending pairs of brackets 106 which are secured to the pylon sections. The pylon structure 96 is actuatable forwardly by means of a double-acting hydraulic cylinder and piston construction 110, which is pivotally connected centrally of the truck by bracket 112 and to plate member 102 by a bracket 114, along I-beams 90 to the position shown in FIGS. 1–3 from a retracted position wherein rear wheels 104 are located at the rear end of the tracks formed by I-beams 90. One of the operator's controls 64 is actuatable to energize cylinder construction 110 in either direction to extend or retract the pylon 96 relative to the front end of the truck, as aforesaid.

Three vertically spaced pivot pins 116, 118 and 120 extend between the sides 100 of pylon 96 for supporting pivotally the cylinder ends of a pair of vertically spaced double-acting cylinders 122 and 124, and a support tube 126, respectively. The piston rod associated with cylinder 122 and the support tube 126 are connected pivotally at the front ends thereof to a centrally located upright member 130 of a load engaging means of loader mechanism 22 at pivot pins 132 and 136, respectively. Tubular member 126 is curved or bent downwardly somewhat in the middle section thereof so as to provide adequate clearance between the tube and the drive axle 38, 40 when the loader mechanism is lowered at the front end of the truck as shown. A bifurcated bracket 134 (FIG. 1) extends upwardly from the front end of member 126, being secured thereto as by welding. A pivot pin 135 is supported in the upper end of bracket 134 and is connected to the end of the piston rod of actuator motor 124. With upright beam member 130 located in a vertical position by cylinder actuator 122 the design of the loader mechanism is such that cylinder actuator 122 is substantially parallel to tubular member 126, so that in said relationship raising and lowering of the loader mechanism relative to pylon 96 will maintain said parallel relationship and the resulting parallelogram action of actuator 122 and support tube 126 maintains upright beam 130 in a vertical position, the vertical distance between pivots 116 and 120 being equal to the vertical distance between pivots 132 and 136. Both cylinder actuators 122 and 124 are double-acting and are connected by conduits, not shown, to the valve means controlled by levers 64 such that from the central position of actuator 122 described above, in which said actuator forms a parallelogram linkage with tube 126, said actuator may be energized in either direction to tilt the load engaging means associated with beam 130 either forwardly or rearwardly about pivot pin 136.

Supported from upright beam 130 is a load engaging construction comprising a hollow transverse square beam 140 which extends through a square opening 142 formed in the bottom of beam 130 and of somewhat larger square dimension than that of beam 140, said beam being mounted on a longitudinally extending pivot pin 144. Pin 144 is supported in the lower section of beam 130 and is preferably axially aligned with the center of opening 142 so that the clearance between opening 142 and beam 140 is equal at the top and bottom. Mounted on opposite sides of member 130 is a pair of fork tines 146 supported on beam 140 by hollow rectangular sections 148, said beam having an upwardly extending load back-rest construction 150 supported therefrom and comprising inverted U-shaped member 152 connected to the opposite ends of beam 140 by brackets 154 and diagonal truss members 156 connected between opposite side portions of member 152 and connected to a pair of horizontal plates 158. A pair of elements 160 are spaced from opposite sides of beam 130, being secured to plates 158 and to the upper surface of beam 140 for supporting plates 156 and 158. A double-acting oscillation cylinder motor 162 is connected by a pivot pin and bracket 164 to the one truss 156 and extends diagonally upwardly therefrom to a pivotal connection 166 mounted on the upper end of upright member 130. Cylinder motor 162 is also controlled from the operator's station by one of control levers 64 for extension or retraction to oscillate the load engaging assembly including fork tines 146, beam 140, and back-rest 150 in opening 142 about pin 144 an amount limited by the design clearance provided between beam 140 and opening 142. This fork oscillating feature, which is operable independently of the remainder of the truck structure and loader mechanism, is of particular value during operation of the truck on rough terrain wherein, for example, it may be necessary to engage a load on fork tines 146 which is located upon a surface which slopes transversely of the truck. In such a circumstance it is not necessary to maneuver the truck so that it is located on the same slope as the load; rather, my invention merely requires that the fork mechanism be oscillated to line up with the load at whatever transverse angle it may be located relative to the truck within the limitations of the oscillation mechanism.

The entire fork assembly which pivots about shaft 144 is a plane transverse of the truck also pivots, of course, about pin 136 which connects upright member 130 to the end of support tube 126 for pivotal movement of the fork assembly in a direction longitudinal of the truck. As mentioned previously, extension of cylinder motor 122 effects a forward tilting movement of the fork assembly about pivot 136 whereas retraction of the motor effect backward tilting movement thereof. Cylinder motor 124 extends diagonally from pivot 118 located a short distance beneath upper pivot 116 of pylon 96 to pivot 134 located a short distance above lower pivot 136 of beam 130. Therefore, full extension of cylinder motor 124 with pylon 96 located in tracks 90 causes the fork assembly to be lowered to ground level for engaging a load, as shown, whereas retraction of motor actuator 124 causes the fork assembly to be elevated with the parallelogram linkage about pivots 120 and 116 to an elevation of approximately five feet above ground level in the design illustrated in FIGS. 1–3. Elevation or lowering of the fork assembly by means of motor actuator 124 with motor actuator 122 in the central position shown causes the fork assembly to be raised and lowered in a level position at all times, i.e., fork tines 146 move up and down in parallel planes throughout the lifting movement thereof. However, if elevation of the fork assembly occurs when motor actuator 122 is extended from said central position to produce a forward tilt of the fork tines 146, the amount of forward tilt will increase with elevation of the fork assembly, while retraction from said central position causing backward tilt of the fork tines will, during elevation of the fork assembly, cause the fork tines to move toward a forward tilt position.

It is important to note that the forwardly opening V-shaped construction of frame members 46 and cover plate 70 provides in conjunction with rearwardly offset drive axle 38, 40 and low elevation transverse frame member 42 a compact arrangement not only for providing drive to the forward wheels and offsetting rearwardly of the axis of said wheels the weight of the drive axle, which is desirable in a lift truck, but it also provides the means whereby the fork assembly can be lowered to ground level. This may be best seen in FIGS. 1 and 3 wherein the tubular support member 126 is located within opening 72 and extends downwardly over rearwardly offset drive axle 38, 40 and over low elevation frame member 42 so that the fork assembly may be lowered to ground level. It will be seen in FIG. 1 that the fork assembly could not be lowered to ground level if, for example, the foregoing combination of structure, or an equivalent thereof, were not provided adjacent the front end of the truck.

After a load has been engaged by fork tines 146 the load may be lifted by motor actuator 124 to an elevation which clears frame members 46, whereupon motor actuator 110 may be retracted which simultaneously lifts and retracts the fork assembly and pylons rearwardly along tracks 90. Motor actuator 124 may then be extended slightly to rest the fork assembly, if desired, in a level position on the frame of the truck, or, alternatively, the fork assembly may be tilted somewhat rearwardly to aid in stabilizing the load on the fork tines during transport of the load over rough ground.

The operator's visibility forwardly of the truck is at times excellent, as will be apparent from a consideration of the relationship between the operator's position at station 20 and that of a load carried by the fork tines. This relationship is best seen in FIG. 2. The vehicle is capable of a high degree of maneuverability and operation over rough terrain and soft ground in view of the nature of the construction utilizing four-wheel drive and relatively narrowly spaced rear steer wheels and relatively widely spaced front wheels for carrying loads on the fork tines in a retracted rest position over the rearwardly offset front axle, so that the truck need not be counterweighted to withstand dynamic loadings which would tend ot overturn a truck having its fork tines supported in operation over rough terrain located in a position forwardly of the front wheels.

Referring now to FIG. 4, a modification of the mounting on truck 10 of the loader mechanism 22 is shown. The construction shown in FIG. 4 is substantially the same as that shown in FIGS. 1–3 except that pylon 96 is mounted fixedly on the frame adjacent the vertex of opening 72, I-beam track 90, rollers 104 and actuator motor means 110 being eliminated from the FIG. 4 embodiment. The FIG. 4 embodiment is simpler and, of course, less costly than the first-described embodiment, but is not preferred since the load handling mechanism 22 cannot be extended and retracted for engaging and transporting loads on the fork assembly. The load handling construction combined with the rearwardly offset front drive axle 38, 40, the rearwardly extending opening 72, and the lowered transverse frame member 42, is, however, of distinct advantage over prior art mechanisms for similar purposes in that the fork assembly is maintained at all times at minimum longitudinal spacing with transverse frame member 42 which locates the fork assembly back-rest 150 substantially rearwardly of the front peripheral portion of wheels 12. This, of course, is significant in trucks of this type since the shorter the distance between the center of gravity of the load carried by fork tines 146 and the axis of wheels 12, the smaller is the counterbalancing moment requirement rearwardly of the axis of wheels 12. Also, it is again noted that drive axle 38, 40 is offset rearwardly of the axis of wheels 12 not only to provide space with opening 72 which permits lowering the fork assembly to ground level, but also to locate additional weight rearwardly of the axis of wheels 12. Likewise, the manner in which the fork assembly is mounted from pylons 96 with the pylons and connecting means located well rearwardly of the axis of wheels 12 also facilitates minimizing wheel base and weight of vehicle rearwardly of the axis of wheels 12. Inasmuch as this truck is particularly designed to be transported by helicopter, for example, for dropping by parachute on beaches, and the like, weight and size considerations are of vital importance.

The combination of novel features provided in both embodiments disclosed herein facilitates the manufacture of a relatively low-cost, highly mobile and maneuverable, lightweight lift truck particularly well adapted for use in rough terrain with or without a load on the fork assembly. For example, it has been possible as a result of the above-described advanced design criteria, to manufacture lift trucks in accordance with either embodiment disclosed herein having all lightweight aluminum frame and body construction, and aluminum parts in the loader mechanism.

Although only two embodiments of my invention are described herein, it will be apparent to persons skilled in the art that various changes in the structure and relative arrangement of parts may be made without departing from the scope of my invention.

I claim:

1. An industrial truck having a pair of laterally spaced, longitudinally extending frame members and an operator's station located transversely outwardly of one of said frame members, comprising a longitudinally extending loader mechanism supported from and intermediate said frame members, including upright structure mounted intermediate the ends of the truck, load engaging means supported forwardly of said upright structure and longitudinally extending lift and tilt motor means connecting said load engaging means to said upright structure, said tilt motor means including parallelogram connecting means extending between said load engaging means and said upright structure, and a drive axle connected to drive wheels which are located at the forward ends of said frame members, said drive axle being offset rearwardly of said drive wheels and said frame members having a rearwardly extending opening therebetween at the front end of the truck, whereby actuation of the lift motor means to lower said load engaging means actuates a portion of the loader mechanism downwardly through said rearwardly extending opening and over said drive axle.

2. A lift truck having a chassis comprising a pair of laterally spaced front drive wheels, a drive axle connected to said drive wheels and offset rearwardly of the axis of said drive wheels, a longitudinal frame supported at the forward end from said drive wheels above said drive axle and providing an opening at the forward end thereof, and a load handling mechanism extending longitudinally of said frame between said drive wheels including upright means supported from said frame and above said opening in said frame, elevatable load engaging means extending forwardly of said frame, forwardly extending pivoted support means connecting said load engaging means to said upright means and motor means connected to said load engaging means for actuating said load engaging means from a lowered to an elevated position with said pivoted support means, said rearwardly offset drive axle and said opening in the frame providing space at the forward end of the chassis in which at least a portion of said load handling mechanism is located when said load engaging means is in a lowered position.

3. A lift truck as claimed in claim 2 wherein said pivoted support means comprises a pair of parallel link means forming with said load engaging means and said upright means a parallelogram linkage for raising and lowering said load engaging means in a substantially fixed attitude, said motor means comprising a fluid pressure actuated cylinder-piston motor connected between said upright means and said load engaging means and extending generally diagonally of said parallel link means.

4. A lift truck as claimed in claim 2 wherein said upright means is located in a longitudinal plane intermediate of said drive wheels, an operator's station is cantilevered outwardly of said frame means on one side of said upright means, and means providing for movement of said load handling mechanism, including said upright means, longitudinally of said chassis.

5. A lift truck as claimed in claim 2 wherein a transverse frame member is connected to the forward end of said frame at a location which lies forwardly of and below the axis of said drive axle.

6. A lift truck as claimed in claim 2 wherein said load engaging means includes a vertical upright frame member, a horizontal frame member pivoted to said vertical frame member, a motor actuating means connected between said latter members for pivoting the horizontal member in a vertical plane, and at least one load engaging member supported from the horizontal member and extending forwardly thereof in a horizontal plane for movement therewith.

7. A lift truck having a chassis comprising a pair of front wheels mounted on stub axles, a longitudinally extending frame supported from and intermediate said wheels and having an opening therein at the forward end thereof, a loader mechanism extending longitudinally of said frame between said wheels including upright means supported from said frame, elevatable load engaging means extending forwardly of said frame, forwarding extending pivoted support means connecting said load engaging means to said upright means, motor means connected to said upright means and to said load engaging means for actuating said load engaging means from a lowered to an elevated position with said pivoted support means, a portion of said pivoted support means being located in said forward opening when said load engaging means is in a lowered position, longitudinally extending guide means supporting said upright means, and motor means for actuating said upright means along said guide means for extending and retracting said load engaging means relative to said wheels.

8. A lift truck as claimed in claim 7 wherein said pivoted support means includes a pair of vertically spaced parallel link means connected to said upright means and to said load engaging means and forming a parallelogram linkage therewith, one of the links of said pivoted support means comprising a reciprocable motor means variable in length for tilting said load engaging means forwardly and rearwardly about the other link means from a level position.

9. A lift truck as claimed in claim 8 wherein reciprocable load lifting means is connected between said upright means and said load engaging means and extends in a generally diagonal direction between said pair of parallel link means.

10. A lift truck as claimed in claim 7 wherein said guide means comprises a track disposed in downwardly sloping relation to the forward end of said truck, said motor means for actuating said upright means along said track means being pivotally connected to said truck.

11. A lift truck as claimed in claim 7 wherein said load handling mechanism is located transversely centrally of said frame and said wheels, and an operator's station cantilevered from one side portion of said frame and rearwardly of said wheels.

12. A lift truck as claimed in claim 7 wherein said load engaging means comprises three load support members extending in different directions and at right angles to each other, the first of said members being connected to said pivoted support means, the second of said members being supported pivotally from said first member, and motor means operatively connecting said first and second members for pivoting the second member relative to the first member, the third of said members being connected to the second member and moved with pivotal movement of the second member.

13. A load handling mechanism comprising upright support means, load engaging means supported upon said upright means for elevation relative thereto, said load engaging means including a relatively fixed vertical center support member having an opening in one end thereof, a pivot member disposed in a horizontal plane and mounted on said vertical support and extending into said opening, a horizontal beam mounted centrally thereof on said pivot member and extending through said opening in said vertical support for pivotal movement in a vertical plane, a horizontal load engaging member extending transversely outwardly of said horizontal beam, and reciprocable motor means operatively connected between said vertical support and said horizontal beam for selectively tilting said load engaging member in either direction within the limitations of movement provided by said opening out of a horizontal plane and with said horizontal beam.

14. A lift truck having a chassis comprising a pair of front wheels mounted on stub axles, a longitudinally extending frame supported from and intermediate said wheels and having an opening therein at the forward end thereof, a loader mechanism extending longitudinally of said frame between said wheels including upright means supported from said frame, elevatable load engaging means extending forwardly of said frame, forwardly extending pivoted support means connecting said load engaging means to said upright means, and motor means connected to said upright means and to said load engaging means for actuating said load engaging means from a lowered to an elevated position with said pivoted support means, a portion of said pivoted support means being located in said forward opening when said load engaging means is in a lowered position, said pivoted support means including a pair of vertically spaced parallel link means connected to said upright means and to said load engaging means and forming a parallelogram linkage therewith, one of the links of said pivoted support means comprising a reciprocable motor means variable in length for tilting said load engaging means forwardly and rearwardly about the other link means from a level position.

15. An industrial truck having a pair of laterally spaced, longitudinally extending frame members comprising a longitudinally extending loader mechanism supported from and intermediate said frame members including upright structure mounted intermediate the ends of the truck, load engaging means supported forwardly of said upright structure and longitudinally extending lift and tilt motor means connecting said load engaging means to said upright structure, said lift and tilt motor means including a pair of vertically spaced parallel link means pivotally connecting said load engaging means to said upright means and forming with said upright structure and load engaging means a parallelogram linkage, one of said links comprising a riciprocable motor means variable in length for tilting the load engaging means forwardly and rearwardly about the other link means from a level position, reciprocable lift motor means also operatively connected between said upright means and said load engaging means for elevating the latter relative to said upright structure and with said parallelogram linkage, said lift motor means extending generally diagonally between said pair of parallel link means, longitudinally extending guide means supporting said upright structure, motor means for actuating said upright means along said guide means for extending and retracting said load engaging means relative to said frame members, and a drive axle connected to drive wheels which are located at the forward ends of said frame members, said drive axle being offset rearwardly of said drive wheels and said frame members having a rearwardly extending opening therebetween at the front end of the truck, whereby actuation of the lift motor means to lower said load engaging means actuates a portion of the loader mechanism downwardly through said rearwardly extending opening and over said drive axle.

References Cited in the file of this patent

UNITED STATES PATENTS

| | | |
|---|---|---|
| Re. 23,546 | Dempster | Sept. 9, 1952 |
| 1,028,975 | Stanley | June 11, 1912 |
| 2,092,663 | Bach | Sept. 7, 1937 |
| 2,126,289 | Schroeder | Aug. 9, 1938 |
| 2,348,899 | Guignard et al. | May 16, 1944 |
| 2,365,167 | Billings | Dec. 19, 1944 |
| 2,621,811 | Lull | Dec. 16, 1952 |
| 2,788,139 | Tendresse | Apr. 9, 1957 |
| 2,820,555 | Lessmann | Jan. 21, 1958 |
| 2,869,744 | Kagel | Jan. 20, 1959 |
| 2,940,625 | Holm | June 14, 1960 |
| 3,039,631 | Baker | June 19, 1962 |
| 3,047,172 | Ulinski | July 31, 1962 |
| 3,074,572 | Ulinski | Jan. 22, 1963 |

FOREIGN PATENTS

| | | |
|---|---|---|
| 1,223,056 | France | Jan. 25, 1960 |